United States Patent
Miyoshi

(10) Patent No.: US 11,021,070 B2
(45) Date of Patent: Jun. 1, 2021

(54) BATTERY PACK AND METHOD OF MANUFACTURING BATTERY PACK

(71) Applicant: Honda Motor Co., Ltd., Tokyo (JP)

(72) Inventor: Kyosuke Miyoshi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/522,627

(22) Filed: Jul. 25, 2019

(65) Prior Publication Data

US 2020/0070670 A1 Mar. 5, 2020

(30) Foreign Application Priority Data

Aug. 31, 2018 (JP) .............................. JP2018-163354

(51) Int. Cl.
| | |
|---|---|
| *B60K 1/00* | (2006.01) |
| *B60L 50/64* | (2019.01) |
| *B60K 1/04* | (2019.01) |
| *H01M 50/20* | (2021.01) |

(52) U.S. Cl.
CPC ................ *B60L 50/64* (2019.02); *B60K 1/04* (2013.01); *H01M 50/20* (2021.01); *H01M 2220/20* (2013.01)

(58) Field of Classification Search
CPC .......... B60L 58/26; B60L 50/66; B60L 50/64; B60K 1/04
See application file for complete search history.

(56) References Cited

U.S. PATENT DOCUMENTS

| | | | | |
|---|---|---|---|---|
| 5,585,204 A | * | 12/1996 | Oshida ................ | H01M 10/633 429/62 |
| 6,158,538 A | * | 12/2000 | Botzelmann ............ | B60K 1/04 180/68.5 |
| 8,936,125 B2 | * | 1/2015 | Nakamori ................ | B60K 1/04 180/68.5 |
| 8,939,246 B2 | * | 1/2015 | Yamaguchi ............. | B60L 50/66 180/68.5 |
| 9,033,084 B2 | * | 5/2015 | Joye ........................ | B23P 11/00 180/68.5 |
| 9,159,970 B2 | * | 10/2015 | Watanabe ........... | H01M 10/613 |
| 9,172,071 B2 | * | 10/2015 | Yoshioka ................ | B60L 50/64 |
| 9,306,201 B2 | * | 4/2016 | Lu ........................ | H01M 2/1077 |
| 9,533,600 B1 | * | 1/2017 | Schwab ................... | B60L 58/26 |
| 9,561,823 B2 | * | 2/2017 | Eberle ...................... | B60K 1/04 |
| 2010/0000816 A1 | * | 1/2010 | Okada ............... | H01M 10/6556 180/68.5 |
| 2013/0192914 A1 | * | 8/2013 | Nakamori ........... | H01M 2/1083 180/68.5 |

(Continued)

FOREIGN PATENT DOCUMENTS

JP 2017-531290 10/2017

*Primary Examiner* — Hau V Phan
(74) *Attorney, Agent, or Firm* — JCIPRNET

(57) ABSTRACT

A battery pack includes a plurality of stacked single battery cells, a case for housing the plurality of stacked single battery cells, and a vehicle body fastening member for fastening the case to a vehicle body frame, wherein the vehicle body fastening member is provided separately from case, is connected to at least one of two side wall parts opposing each other in a width direction of the case by a hooking structure facing an upper surface and a lower surface of the side wall part, and is provided independently at a plurality of arbitrary positions along a length direction of the case.

8 Claims, 9 Drawing Sheets

(56) References Cited

U.S. PATENT DOCUMENTS

| | | | |
|---|---|---|---|
| 2015/0174996 A1* | 6/2015 | Ikeda | B60K 1/04 |
| | | | 180/68.5 |
| 2017/0225558 A1* | 8/2017 | Newman | H01M 2/1083 |
| 2018/0050607 A1* | 2/2018 | Matecki | B60K 1/04 |
| 2018/0237075 A1* | 8/2018 | Kawabe | B60K 1/04 |

* cited by examiner

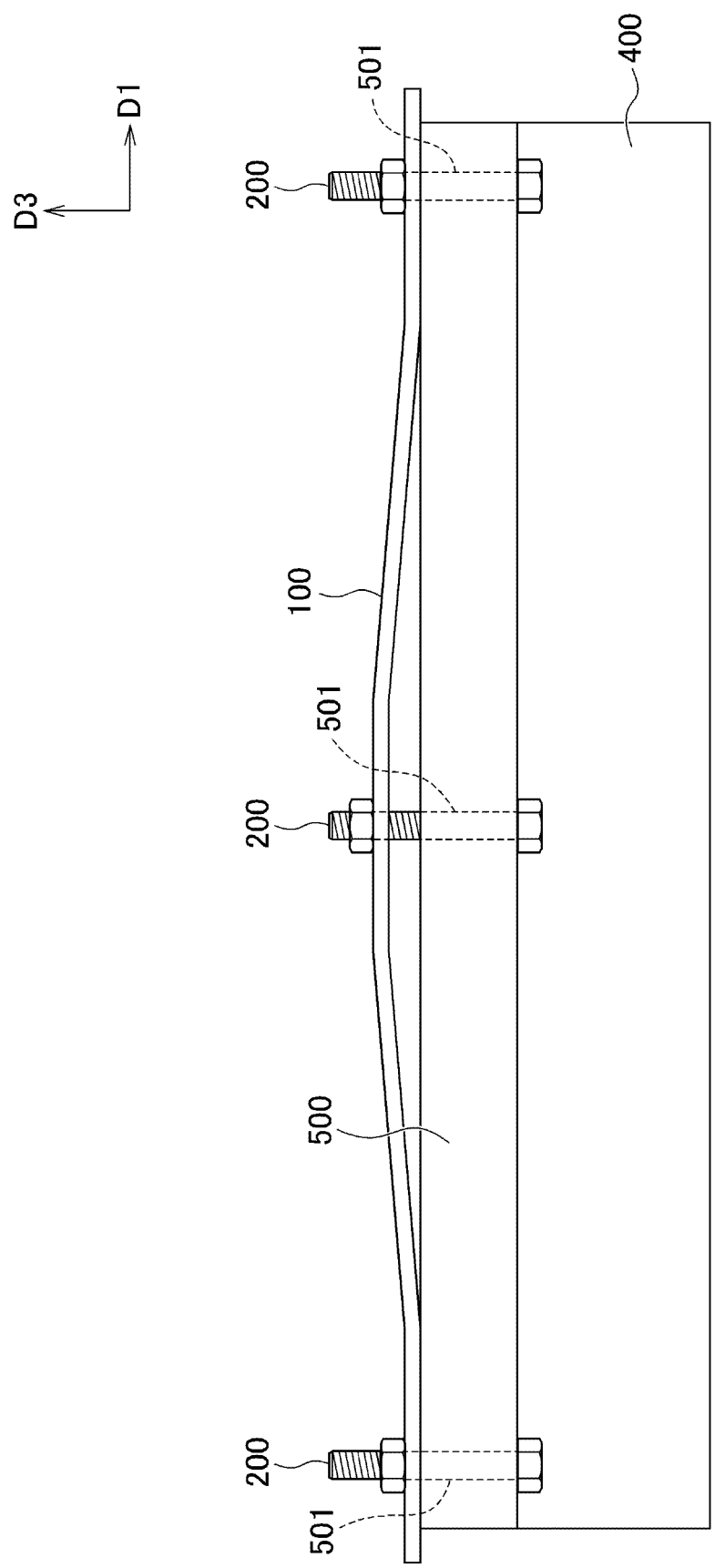

BATTERY PACK AND METHOD OF MANUFACTURING BATTERY PACK

CROSS-REFERENCE TO RELATED APPLICATION

This application claims the priority benefits of Japan Patent Application No. 2018-163354, filed on Aug. 31, 2018. The entirety of the above-mentioned patent application is hereby incorporated by reference herein and made a part of this specification.

BACKGROUND

Technical Field

The disclosure relates to a battery pack and a method of manufacturing a battery pack.

Description of Related Art

Compared with conventional gasoline cars, hybrid cars, electric cars, or the like equipped with an electric motor require a large amount of electric power, so they are provided with a plurality of single battery cells such as lithium ion batteries. In general, a plurality of single battery cells are stacked and housed in a casing or the like to form a battery pack. The battery pack is fastened to a vehicle body via a vehicle body fastening member.

Conventionally, to attach a battery pack to a vehicle body, it is known that a fixing flange as a vehicle body fastening member is attached by welding to the side surface of the casing of the battery pack (for example, see Patent Document 1).

RELATED ART

Patent Document(s)

[Patent Document 1] Japanese Laid-open No. 2017-531290

However, in the above-described conventional battery pack, in the case where the vehicle body fastening member is welded to the side surface of the casing, there is an issue that positioning of the vehicle body fastening member with respect to the side surface of the casing is difficult. Furthermore, when welding the vehicle body fastening member, distortion (thermal distortion) occurs in the casing due to heat input at the time of welding, and there is also an issue that the position of the vehicle body fastening member with respect to the vehicle body frame may shift. If the position of the vehicle body fastening member shifts, the fastening portion with respect to the vehicle body frame may shift, or the separation distance between the battery pack and the vehicle body frame may shift, which may make it difficult to fasten the battery pack to the appropriate position of the vehicle body frame.

Therefore, the disclosure provides a battery pack and a method of manufacturing a battery pack in which a vehicle body fastening member for fastening the battery pack to a vehicle body frame can be easily positioned and provided at arbitrary positions without the risk of deformation such as thermal distortion resulting from the heat input.

SUMMARY

A battery pack according to the disclosure is a battery pack (e.g., a battery pack 1 to be described later) including a plurality of stacked single battery cells (e.g., single battery cells 31 to be described later), a case (e.g., a case 2 to be described later) for housing the plurality of stacked single battery cells, and a vehicle body fastening member (e.g., a vehicle body fastening member 4 to be described later) for fastening the case to a vehicle body frame (e.g., a vehicle body frame 100 to be described later). The vehicle body fastening member is provided separately from the case, is connected to at least one of two side wall parts (e.g., side wall parts 23 to be described later) opposing each other in a width direction of the case by a hooking structure (e.g., a clamping part 41 to be described later) facing an upper surface (e.g., an upper horizontal wall surface 252 to be described later) and a lower surface (e.g., a lower horizontal wall surface 252 to be described later) of the side wall part, and is independently provided at a plurality of arbitrary positions along a length direction of the case.

According to the battery pack described above, the vehicle body fastening member is connected by the hooking structure facing the upper surface and the lower surface of the side wall part of the case, and since it is independently provided at a plurality of arbitrary positions along the length direction of the case, the vehicle body fastening member for fastening the battery pack to the vehicle body frame can be easily positioned and provided at arbitrary positions without the risk of deformation such as thermal distortion resulting from heat input.

A method of manufacturing a battery pack according to the disclosure is a method of manufacturing a battery pack (e.g., a battery pack 1 to be described later) including a plurality of stacked single battery cells (e.g., single battery cells 31 to be described later), a case (e.g., a case 2 to be described later) for housing the plurality of stacked single battery cells, and a vehicle body fastening member (e.g., a vehicle body fastening member 4 to be described later) for fastening the case to a vehicle body frame (e.g., a vehicle body frame 100 to be descried later). The method includes the following steps. The case is extrusion-molded with a metal material along a stacking direction of the single battery cells. At a plurality of arbitrary positions along a length direction of the case, the vehicle body fastening member, which is provided separately from the case, is independently connected to at least one of two side wall parts (e.g., side wall parts 23 to be described later) opposing each other in a width direction of the case by a hooking structure (e.g., a clamping part 41 to be described later) facing an upper surface (e.g., an upper horizontal wall surface 252 to be described later) and a lower surface (e.g., a lower horizontal wall surface 252 to be described later) of the side wall part. Afterwards, the vehicle body fastening member is bonded to the case respectively by friction stir welding from at least one direction in a vertical direction of the case with the upper surface or the lower surface of the side wall part as a load receiving surface.

According to the method of manufacturing a battery pack described above, the vehicle body fastening member is connected by the hooking structure facing the upper surface and the lower surface of the side wall part of the case, and since it is independently provided at a plurality of arbitrary positions along the length direction of the case, the vehicle body fastening member for fastening the battery pack to the vehicle body frame can be easily positioned and provided at arbitrary positions. Also, since the vehicle body fastening member is bonded to the extrusion-molded case by friction stir welding, for example, as in the case of bonding by laser welding or the like, there is no risk of causing distortion in the case due to thermal distortion occurring at the welding portion. Furthermore, since the upper surface or the lower surface of the side wall part serves as the load receiving surface at the time of friction stir welding, the load at the time of bonding is unlikely to act on the opening part of the case, and the risk of deformation of the case can be reduced.

BRIEF DESCRIPTION OF THE DRAWINGS

FIG. 9 is a side view showing a state in which the battery pack shown in FIG. 8 is fastened to the vehicle body frame.

DESCRIPTION OF THE EMBODIMENTS

Figure 1:
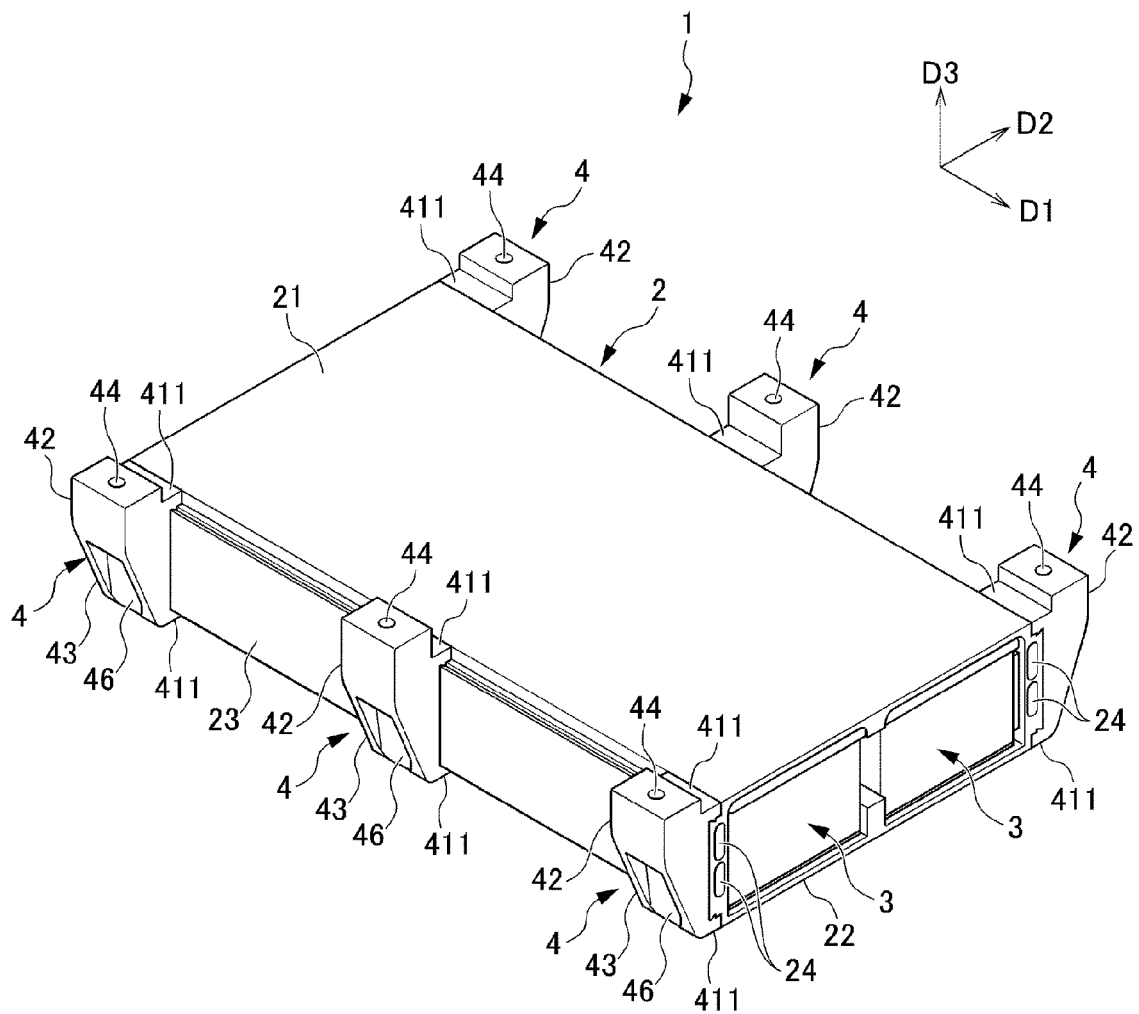
FIG. 1 is a perspective view showing an embodiment of a battery pack according to the disclosure.

In the battery pack described above, the vehicle body fastening member may have a clamping part (e.g., a clamping part 41 to be described later) which abuts the upper surface and the lower surface of the side wall part to clamp the side wall part from above and below, and the vehicle body fastening member may be hooked and connected to the side wall part by the clamping part.

According to the battery pack described above, since the vehicle body fastening member is hooked and connected by clamping the side wall part from above and below through the clamping part, it is possible to easily and reliably connect the vehicle body fastening member to the case.

In the battery pack described above, the vehicle body fastening member may have a clamping projected part (e.g., a clamping projected part 45 to be described later) or a clamping groove part on an inner surface (e.g., an inner surface 411a to be described later) of the clamping part respectively opposite to the upper surface and the lower surface of the side wall part, an engaging groove part (e.g., an engaging groove part 26 to be described later) corresponding to the clamping projected part or an engaging projected part corresponding to the clamping groove part may be provided on the upper surface and the lower surface of the side wall part, and the vehicle body fastening member may be hooked and connected to the side wall part by engagement of the clamping projected part or the clamping groove part and the engaging groove part or the engaging projected part.

According to the battery pack described above, the vehicle body fastening member is more reliably positioned with respect to the case by the engagement of the clamping projected part or the clamping groove part and the engaging groove part or the engaging projected part.

In the battery pack according above, the engaging groove part or the engaging projected part may be provided along the length direction of the case, and the vehicle body fastening member may be independently provided at a plurality of arbitrary positions along a length direction of the engaging groove part or the engaging projected part by the clamping part.

According to the battery pack described above, since the vehicle body fastening member can be slid and moved along the length direction of the case with the clamping projected part or the clamping groove part engaged with the engaging groove part or the engaging projected part, positioning of the vehicle body fastening member is further facilitated. In addition, positioning of the vehicle body fastening member with respect to the width direction of the case is also facilitated by the engagement of the clamping projected part or the clamping groove part and the engaging groove part or the engaging projected part.

In the battery pack according above, the vehicle body fastening member may further have a flange part (e.g., a flange part 42 to be described later) which is provided so as to protrude from an upper part of the clamping part to a side of the case and forms a fastening part with the vehicle body frame, and a beam part (e.g., a beam part 43 to be described later) which extends obliquely from the clamping part to the flange part.

According to the battery pack described above, since the beam part provides reinforcement between the clamping part and the flange part, it is possible to improve the strength of the vehicle body fastening part.

In the battery pack according above, the vehicle body fastening member may have a thinned part (e.g., a thinned part 46 to be described later) which is thinned with the beam part left on an outer side of the clamping part, and the flange part may have a bolt insertion hole (e.g., a bolt insertion hole 44 to be described later) which vertically penetrates through the flange part and is opened toward the thinned part.

According to the battery pack described above, it is possible to achieve weight reduction without reducing the strength of the vehicle body fastening member. In addition, it is possible to easily perform a bolt fastening operation by using the thinned part.

In the method of manufacturing a battery pack according above, the vehicle body fastening member may have a clamping part (e.g., a clamping part 41 to be described later) which abuts the upper surface and the lower surface of the side wall part to clamp the side wall part from above and below, and when the vehicle body fastening member is independently connected to the plurality of arbitrary positions along the length direction of the case, the vehicle body fastening member may be hooked and connected to the side wall part by the clamping part.

According to the method of manufacturing a battery pack described above, since the vehicle body fastening member is hooked and connected by clamping the side wall part from above and below through the clamping part, it is possible to easily and reliably connect the vehicle body fastening member to the case.

In the method of manufacturing a battery pack according above, the vehicle body fastening member may have a clamping projected part (e.g., a clamping projected part 45 to be described later) or a clamping groove part on an inner surface (e.g., an inner surface 411a to be described later) of the clamping part opposite to the upper surface and the lower surface of the side wall part, an engaging groove part (e.g., an engaging groove part 26 to be described later) corresponding to the clamping projected part or an engaging projected part corresponding to the clamping groove part may be provided on the upper surface and the lower surface of the side wall part, and when the vehicle body fastening member is independently connected to the plurality of arbitrary positions along the length direction of the case, the vehicle body fastening member may be hooked and connected to the side wall part by engagement of the clamping projected part or the clamping groove part and the engaging groove part or the engaging projected part of the case.

According to the method of manufacturing a battery pack described above, the vehicle body fastening member can be more reliably positioned with respect to the case by the engagement of the clamping projected part or the clamping groove part and the engaging groove part or the engaging projected part. In addition, due to the engagement of the clamping projected part or the clamping groove part and the engaging groove part or the engaging projected part, there is no risk of displacing the vehicle body fastening member at the time of friction stir welding.

In the method of manufacturing a battery pack according above, the engaging groove part or the engaging projected part may be provided along the length direction of the case, and when the vehicle body fastening member is independently connected to the plurality of arbitrary positions along the length direction of the case, the positions along the length direction of the case may be adjusted by sliding and moving the vehicle body fastening member along the engaging groove part or the engaging projected part through the clamping part.

According to the method of manufacturing a battery pack described above, since the vehicle body fastening member can be slid and moved along the length direction of the case with the clamping projected part or the clamping groove part engaged with the engaging groove part or the engaging projected part, positioning of the vehicle body fastening member is further facilitated.

According to the disclosure, it is possible to provide a battery pack and a method of manufacturing a battery pack in which a vehicle body fastening member for fastening the battery pack to a vehicle body frame can be easily positioned and provided at arbitrary positions without the risk of deformation such as thermal distortion resulting from heat input.

Figure 2:
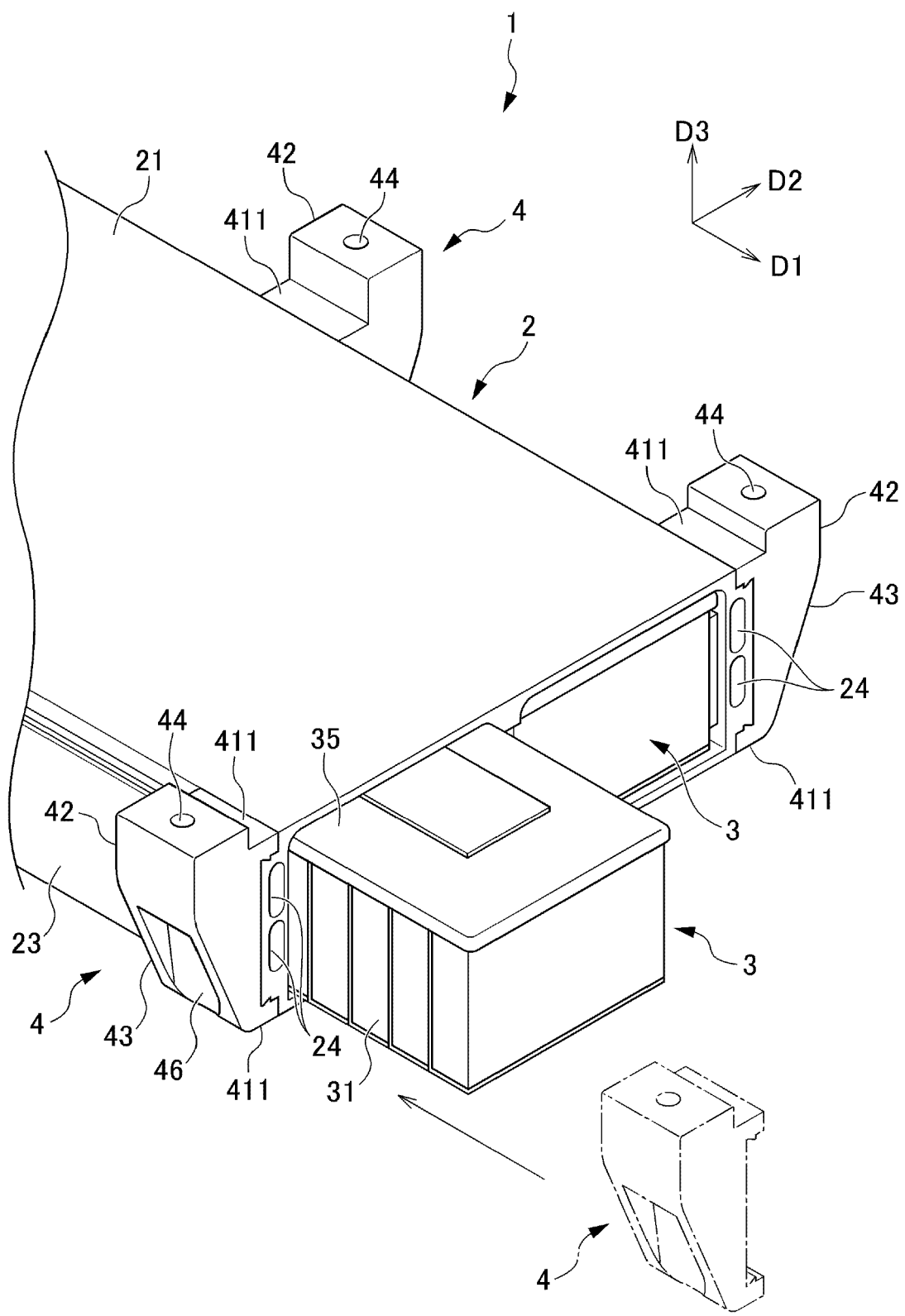
FIG. 2 is an enlarged view showing an essential part of the battery pack shown in FIG. 1.
Figure 3:
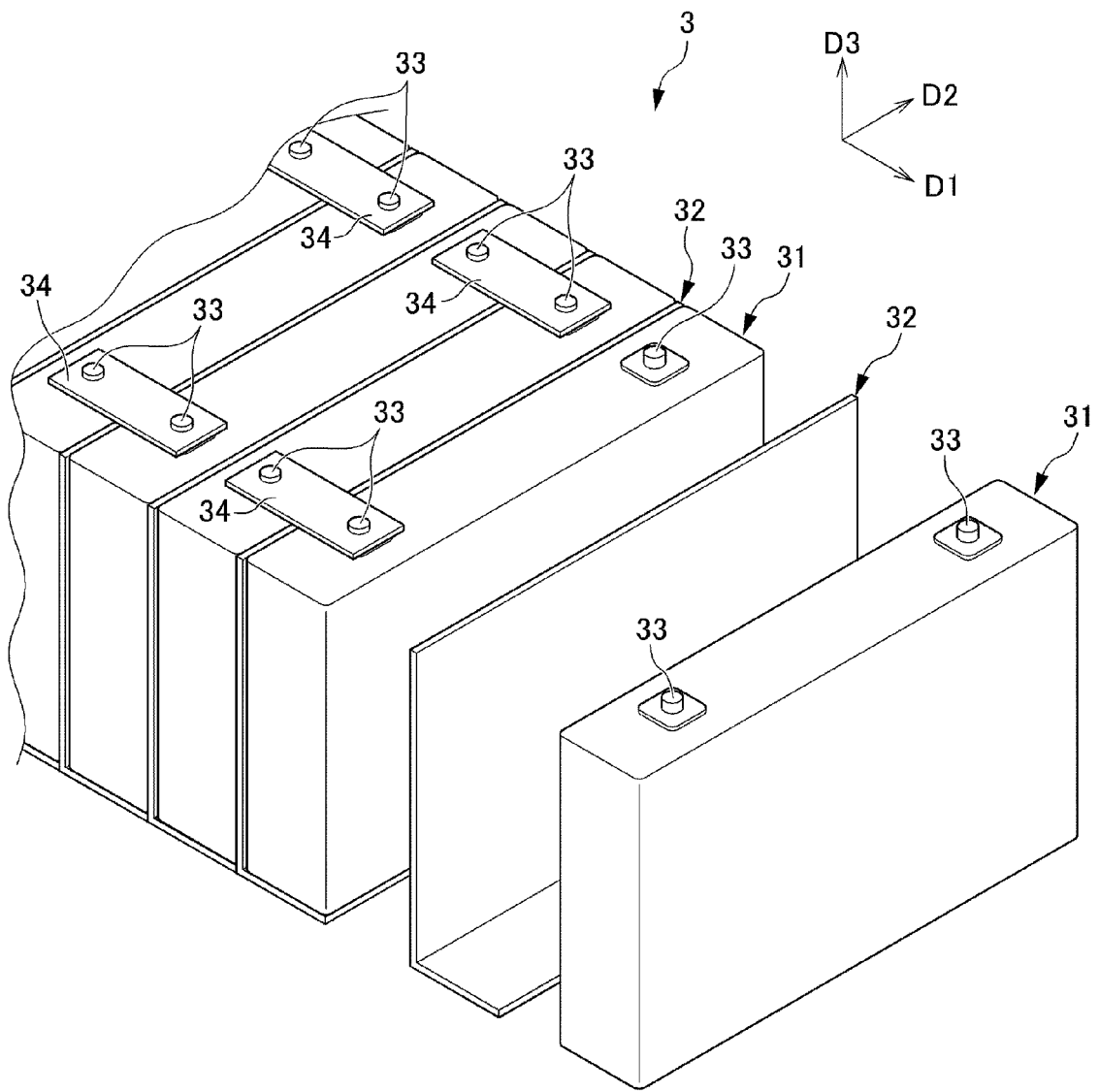
FIG. 3 is an explanatory view showing single battery cells housed in a case of the battery pack shown in FIG. 1.
Figure 4:
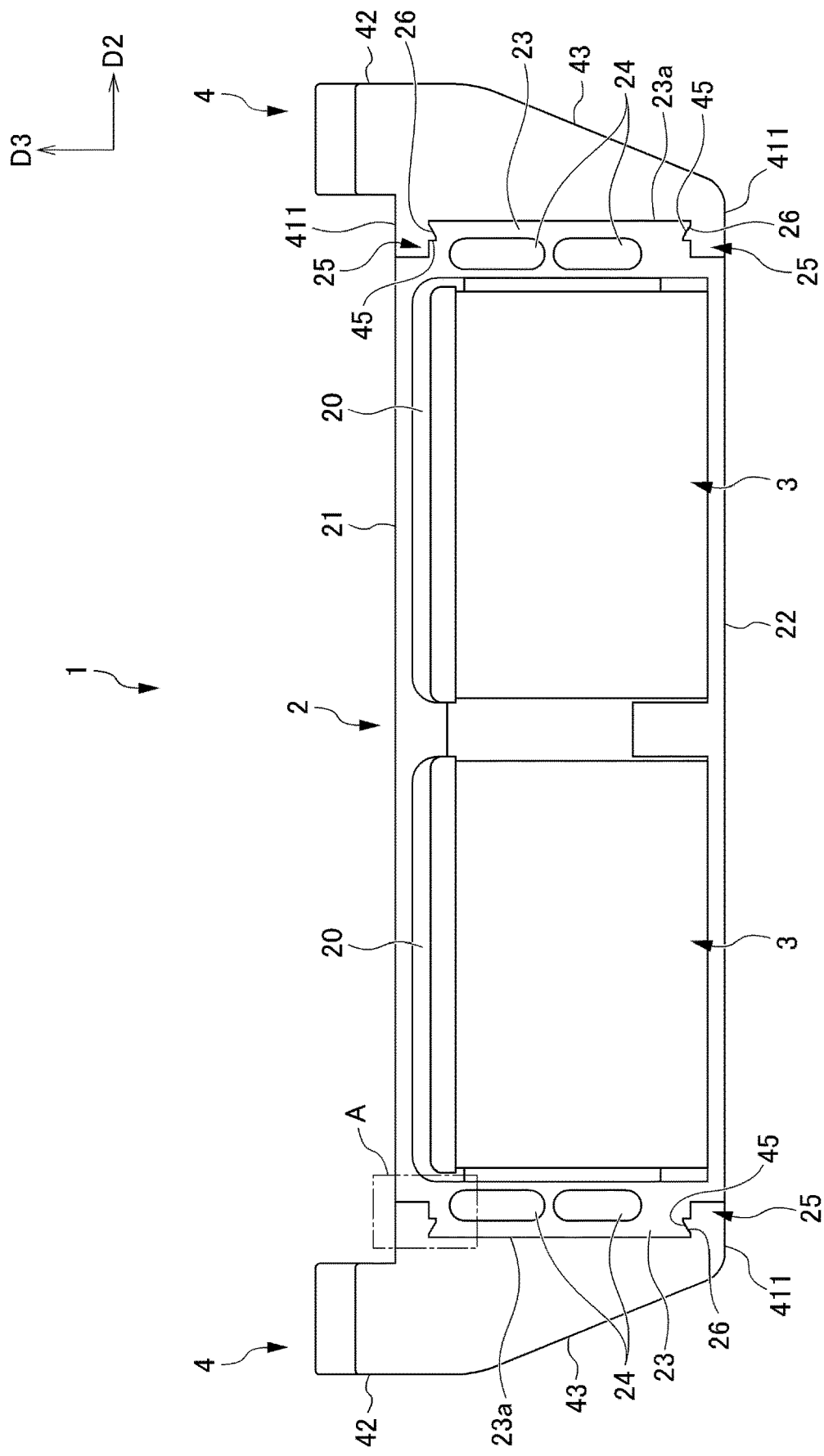
FIG. 4 is a front view of the battery pack shown in FIG. 1.
Figure 5A:
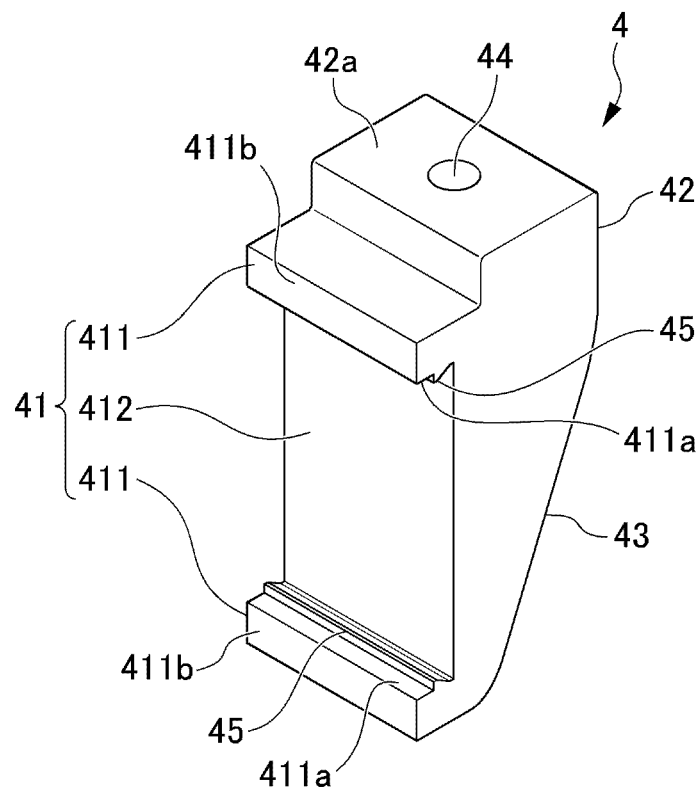
FIG. 5A is a perspective view showing a vehicle body fastening member provided in the battery pack shown in FIG. 1.
Figure 5B:
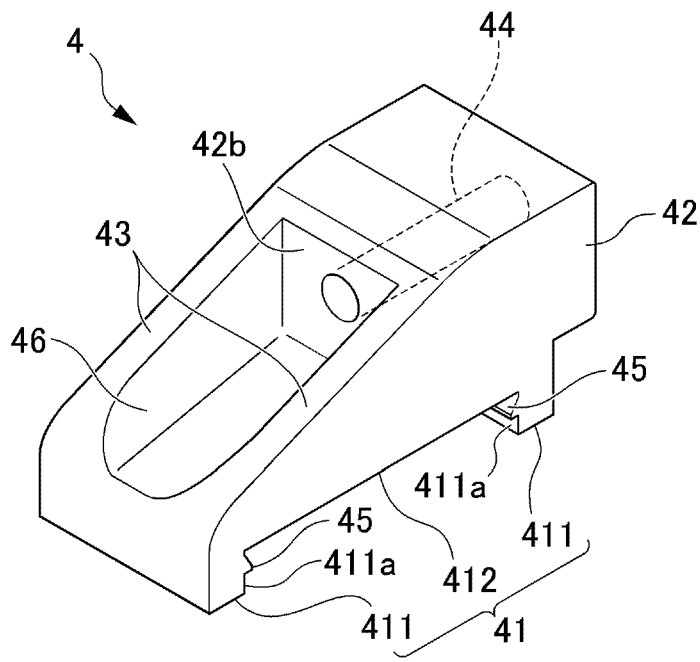
FIG. 5B is a perspective view showing the vehicle body fastening member provided in the battery pack shown in FIG. 1.
Figure 6:
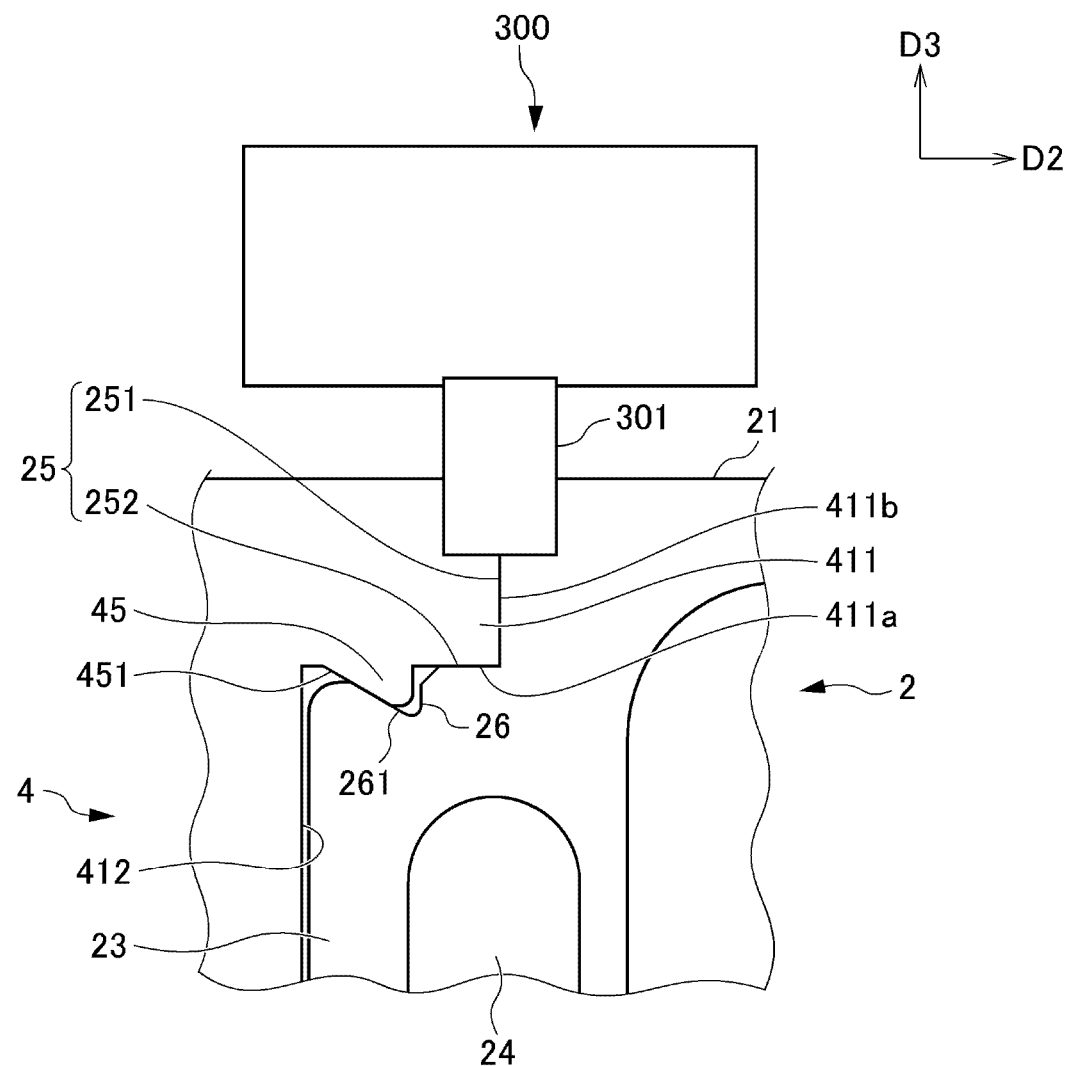
FIG. 6 is an enlarged view of a portion A indicated by a rectangular region in FIG. 4 for illustrating a bonding method of the vehicle body fastening member.
Figure 7:
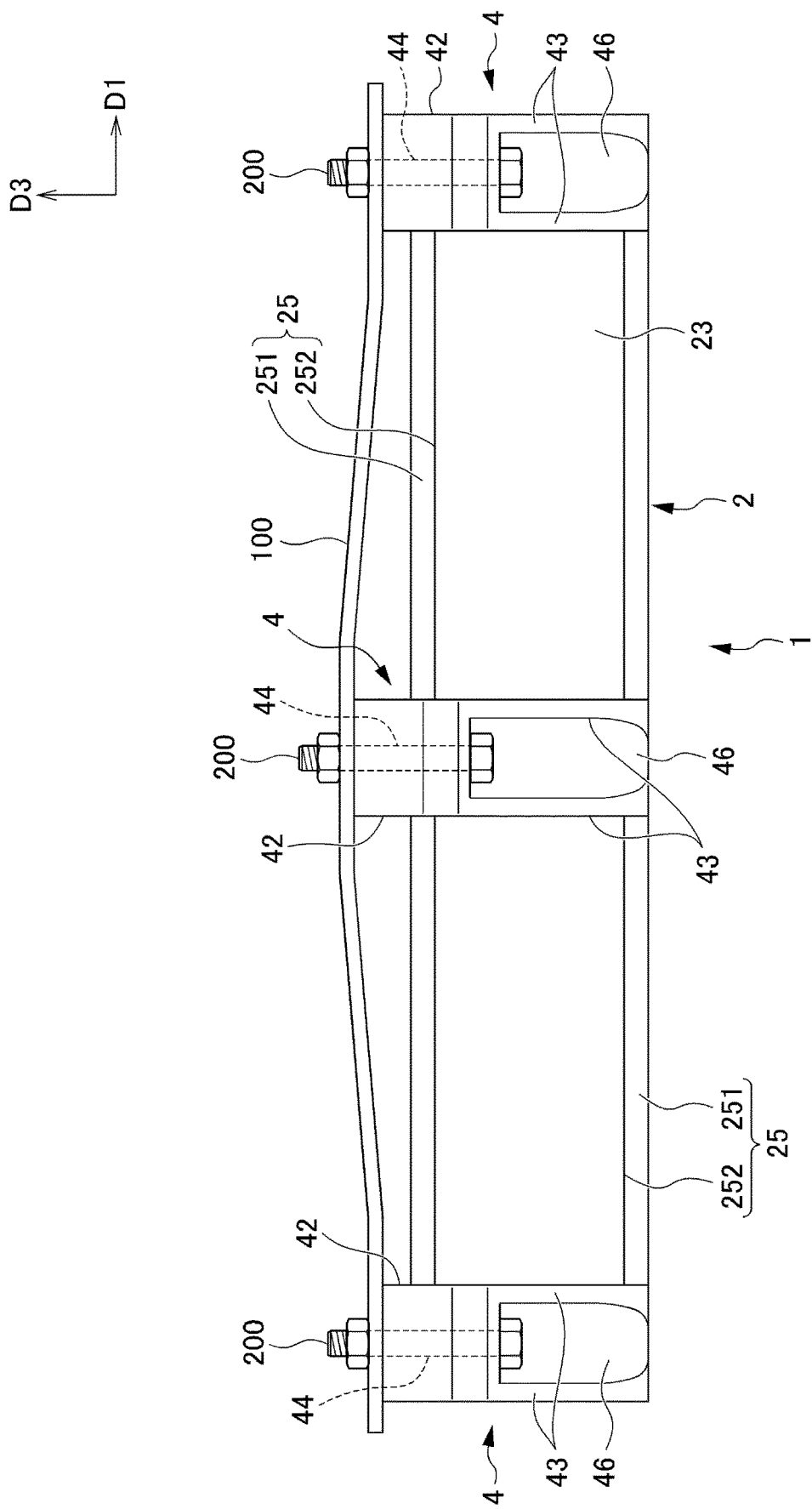
FIG. 7 is a side view showing a state in which the battery pack shown in FIG. 1 is fastened to a vehicle body frame.

Hereinafter, embodiments of the disclosure will be described with reference to the drawings. FIG. 1 is a perspective view showing an embodiment of a battery pack according to the disclosure. FIG. 2 is an enlarged view showing an essential part of the battery pack shown in FIG. 1. FIG. 3 is an explanatory view showing single battery cells housed in a case of the battery pack shown in FIG. 1. FIG. 4 is a front view of the battery pack shown in FIG. 1. FIG. 5A and FIG. 5B are perspective views showing a vehicle body fastening member provided in the battery pack shown in FIG. 1. FIG. 6 is an enlarged view of a portion A indicated by a rectangular region in FIG. 4 for illustrating a bonding method of the vehicle body fastening member. FIG. 7 is a side view showing a state in which the battery pack shown in FIG. 1 is fastened to a vehicle body frame. As shown in FIG. 1, a battery pack 1 has a case 2, single battery cell groups 3 housed along the length direction of the case 2, and vehicle body fastening members 4 respectively provided on two sides of the case 2 in the length direction.

Among the directions indicated by the arrows in the drawings herein, the direction along the D1 direction indicates the length direction of the battery pack 1. The direction along the D2 direction indicates the width direction of the battery pack 1. The direction along the D3 direction indicates the height direction of the battery pack 1. The D3 direction indicates the "upper" of the battery pack 1, and the opposite direction indicates the "lower" of the battery pack 1.

The case 2 shown in the present embodiment is formed of a rigid body such as aluminum or an aluminum alloy into a rectangular cylindrical shape. The case 2 may be formed of an extrusion-molded product extruded and molded along the D1 direction. Accordingly, the case 2 may be easily formed. Moreover, since the case 2 formed of the extrusion-molded product does not have a bonding part which bonds the plate members to each other, assembly variation and thermal distortion resulting from the bonding part do not occur. Therefore, it is possible to form the battery pack 1 having the case 2 of a stable shape.

The two ends of the case 2 in the length direction are respectively opened in a horizontally long rectangular shape. The case 2 has an upper wall part 21, a lower wall part 22, and two side wall parts 23 and 23, and a housing part 20 of the single battery cell group 3 is formed of a space surrounded by the upper wall part 21, the lower wall part 22, and the side wall parts 23 and 23. In the present embodiment, two housing parts 20 and 20 are arranged in parallel inside the case 2. Also, inside the two opposing side wall parts 23 and 23, temperature control medium flow paths 24 and 24 for circulating a gas or a liquid for exchanging heat between single battery cells 31 of the single battery cell group 3 (to be described later) are respectively provided along the length direction of the case 2

As shown in FIG. 3, the single battery cell group 3 is formed by stacking a plurality of single battery cells 31 in a rectangular parallelepiped shape made of, for example, lithium ion secondary batteries along the D1 direction. A plate-shaped insulating separator 32 is respectively arranged between the single battery cells 31 and 31 adjacent to each other in the stacking direction and is sandwiched by the single battery cells 31 and 31 adjacent to each other. The single battery cell 31 is formed by housing an electrode body (not shown) in a cell case made of aluminum, an aluminum alloy, etc., and has a pair of positive and negative electrode terminals 33 on the top surface. The electrode terminals 33 and 33 of two single battery cells 31 and 31 adjacent to each other in the stacking direction are electrically connected by a bus bar 34. Accordingly, all single battery cells 31 of the single battery cell group 3 are electrically connected in series or in parallel. Further, as shown in FIG. 2, a cover 35 is arranged on the top surface of the single battery cell group 3 to protect the electrode terminals 33 and the like arranged on the top surface.

The single battery cell group 3 is slid along the stacking direction of the single battery cells 31 and meanwhile inserted into the housing part 20 inside the case 2. The battery pack 1 shown in the present embodiment has two housing parts 20 and 20 inside the case 2 and houses two single battery cell groups 3 and 3 in parallel, but the case 2 may also have only one housing part 20 and house only one single battery cell group 3 in the housing part 20.

The single battery cell group 3 housed in the case 2 may be integrated by being bound by a binding band, etc. (not shown) in order to maintain the stacked state of the single battery cells 31. Further, the single battery cell group 3 housed in the case 2 may be pressed and held in the stacking direction of the single battery cells 31 by a lid member (not shown) which covers the opening part of the case 2. The lid member may be a plate-shaped member or a box-shaped member.

Because of the presence of the temperature control medium flow paths 24, the side wall part 23 of the case 2 has a wall thickness larger than each wall thickness of the upper wall part 21 and the lower wall part 22. As shown in FIG. 4 and FIG. 6, at the connecting portions between the side wall part 23 and upper wall part 21 and lower wall part 22, a recessed stepped part 25 having a shape in which the corner of the case 2 is turned at a substantially right angle is formed over the entire length of the case 2 in the length direction. The stepped part 25 is a portion to which the vehicle body fastening member 4 (to be described later) is connected.

Specifically, as shown in FIG. 6, the stepped part 25 is formed of a vertical wall surface 251 extending in the vertical direction respectively from the upper wall part 21 and the lower wall part 22 toward the temperature control medium flow paths 24, and a horizontal wall surface 252 arranged in parallel with the upper wall part 21 and the lower wall part 22. Here, the horizontal wall surface 252 of the upper stepped part 25 (the upper horizontal wall surface 252) corresponds to the upper surface of the side wall part 23 of the disclosure, and the horizontal wall surface 252 of the lower stepped part 25 (the lower horizontal wall surface 252) corresponds to the lower surface of the side wall part 23 of the disclosure.

It is noted that, among the stepped parts 25 respectively formed in the upper and lower portions of the side wall parts 23, the stepped part 25 shown in FIG. 6 only shows the stepped part 25 on the upper left side of the case 2 as shown by the rectangular region A in FIG. 4. The stepped part 25 on the upper right side of the case 2 is laterally symmetrical with that in FIG. 6, and the left and right stepped parts 25 at the bottom of the case 2 are vertically symmetrical with the left and right stepped parts 25 at the top.

An engaging groove part 26, as shown in FIG. 6, is formed on the horizontal wall surface 252 in each of the stepped parts 25. The inner surface of the engaging groove part 26 has an inclined surface 261 inclined from the outer side of the case 2 (the outer side of the case 2 along the D2 direction) toward the housing part 20 of the case 2. The inclined surfaces 261 and 261 respectively of the upper and lower stepped parts 25 are inclined such that the distance therebetween becomes wider toward the outer side of the case 2.

The vehicle body fastening member 4 is a member for fastening the case 2 (the battery pack 1) to a vehicle body frame 100 (see FIG. 7) by a bolt 200. The vehicle body fastening member 4 is formed separately from the case 2 by aluminum, an aluminum alloy, and the like. A plurality of vehicle body fastening members 4 are provided to the case 2. In the present embodiment, a total of six vehicle body fastening members 4 are provided, with three on each of the two sides of the case 2 in the width direction, but the number of the vehicle body fastening members 4 is not limited thereto.

Figure 8:
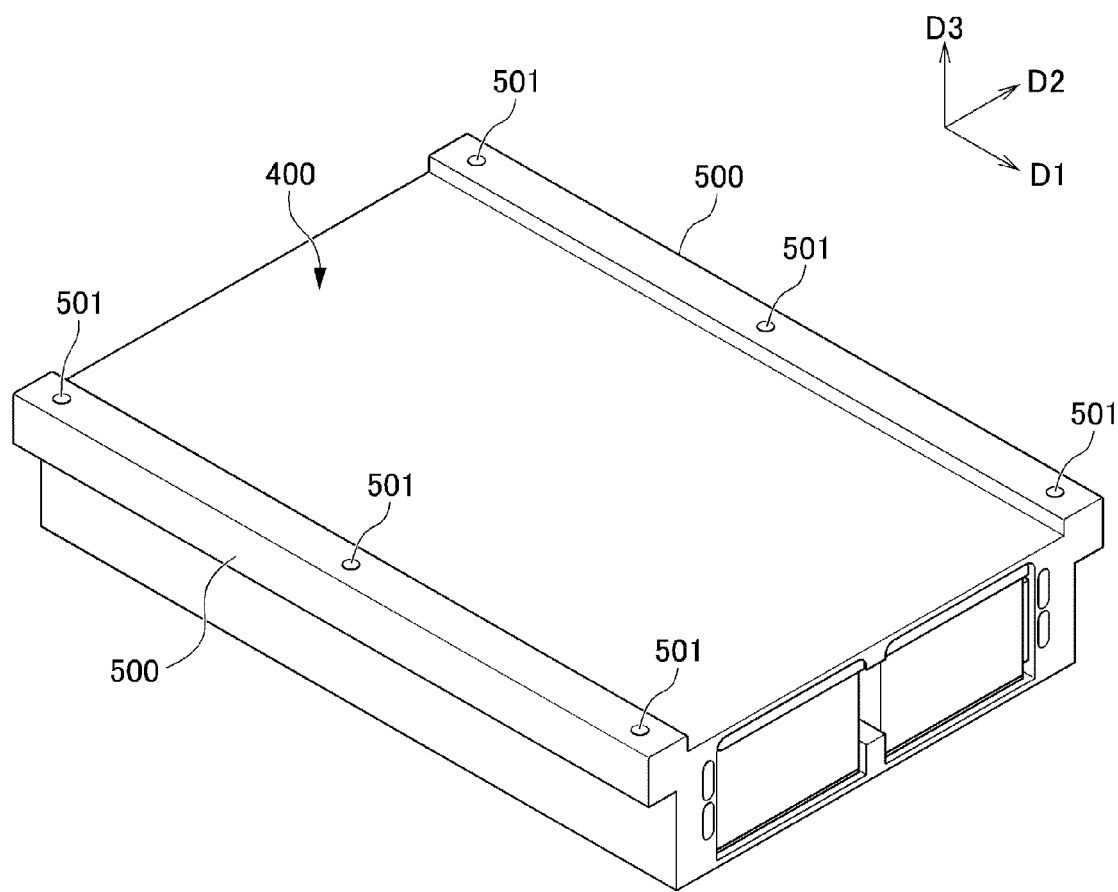
FIG. 8 is a perspective view showing a comparative example of the battery pack.

Since the vehicle body fastening members 4 are provided independently with respect to the case 2 with the required number respectively, compared with the case where a fastening part 500 for the vehicle body frame is integrally extruded and formed on the two sides of a case 400 in the length direction as in, for example, the comparative example shown in FIG. 8, an unused structural portion is not generated at a portion (between adjacent fastening points 501 and 501) other than the fastening points 501 (the bolt insertion holes) for the vehicle body frame. In other words, it is possible to achieve weight reduction of the battery pack 1 by respectively providing the vehicle body fastening members 4 of the required number independently with respect to the case 2.

The vehicle body fastening member 4 has a clamping part 41, a flange part 42, a beam part 43, and a bolt insertion hole 44, as shown in FIG. 5A and FIG. 5B. The clamping part 41 is a portion for clamping the side wall part 23 of the case 2 from above and below and forms a hooking structure of the disclosure in the vehicle body fastening member 4. The clamping part 41 is formed of a pair of upper and lower clamping pieces 411 and 411 and a connecting part 412 connecting the clamping pieces 411 and 411. In the description of the vehicle body fastening member 4, the orientation shown in FIG. 5A is used as a reference. The vertical direction in FIG. 5A is the direction along the D3 direction. Therefore, the upper side of FIG. 5A indicates the "upper" of the vehicle body fastening member 4, and the lower side indicates the "lower" of the vehicle body fastening member 4.

The pair of clamping pieces 411 and 411 is vertically spaced apart and arranged in parallel with each other, and protrudes to be orthogonal to the connecting part 412 formed of a substantially flat surface. The distance between the clamping pieces 411 and 411 is equal to the distance between the upper and lower horizontal wall surfaces 252 and 252 that form the upper surface and the lower surface of the side wall part 23 of the case 2. Inner surfaces 411a and 411a of the clamping pieces 411 and 411 are surfaces opposite to the horizontal wall surfaces 252 and 252 of the side wall part 23. Clamping projected parts 45 and 45 engageable with the engaging groove parts 26 and 26 formed on the horizontal wall surfaces 252 and 252 of the side wall part 23 are provided to protrude on the inner surfaces 411a and 411a.

The clamping projected part 45 has a shape corresponding to the engaging groove part 26. Specifically, as shown in FIG. 6, the outer surface of the clamping projected part 45 has an inclined surface 451 inclined from the outer side of the case 2 (the outer side of the case 2 along the D2 direction) toward the housing part 20 of the case 2. The inclined surfaces 451 and 451 respectively of the upper and lower clamping projected parts 45 are inclined such that the distance therebetween becomes wider toward the outer side of the case 2. The inclined surface 451 of the clamping projected part 45 is inclined at the same angle as the inclined surface 261 of the engaging groove part 26.

The connecting part 412 extends flatly between the pair of clamping pieces 411 and 411 along the vertical direction of the case 2. The connecting part 412 is a portion that abuts along an outer surface 23a of the side wall part 23 extending straight in the vertical direction when the vehicle body fastening member 4 is attached to the case 2. The clamping part 41 of the vehicle body fastening member 4 is formed in a U-shape by the pair of clamping pieces 411 and 411 and the connecting part 412.

The flange part 42 is a fastening portion in the vehicle body fastening member 4 with respect to the vehicle body frame 100, and is provided so as to protrude in a block shape to the side of the case 2 (the outer side of the case 2 in the width direction) from the clamping part 41 toward a direction opposite to the protruding direction of the clamping piece 411 with respect to the connecting part 412. The flange part 42 protrudes toward the upper side of the case 2 farther than the upper clamping piece 411.

The beam part 43 obliquely extends from the outer side of the lower clamping piece 411 in the clamping part 41 to the outer side of the flange part 42. Since the beam part 43 provides reinforcement between the clamping part 41 and the flange part 42 by obliquely connecting the clamping part 41 and the flange part 42, it is possible to improve the strength of the vehicle body fastening member 4.

As shown in FIG. 5B, the vehicle body fastening member 4 has a thinned part 46 on the outer side of the clamping part 41. The thinned part 46 is a member from which an unused structural portion in the vehicle body fastening member 4 is removed, and is provided to be recessed from the outer side of the clamping part 41 (the opposite direction of the protruding direction of the clamping piece 411). The width of the thinned part 46 is smaller than the width of the vehicle body fastening member 4. For this reason, the two beam parts 43 and 43 remain on the two sides of the thinned part 46. Therefore, the thinned part 46 is formed by thinning over the clamping part 41 and the flange part 42 with the beam parts 43 left. By providing the thinned part 46 with the beam parts 43 left, the vehicle body fastening member 4 is reduced in weight without loss of strength.

The bolt insertion hole 44 is a portion through which the bolt 200 for bolting the vehicle body fastening member 4 to the vehicle body frame 100 is inserted, and is provided to vertically penetrate through the flange part 42. In other words, the upper end of the bolt insertion hole 44 is opened at an upper surface 42a of the flange part 42. Further, the lower end of the bolt insertion hole 44 is opened at a lower surface 42b of the flange part 42. The lower surface 42b of the flange part 42 faces the thinned part 46. Therefore, the lower end of the bolt insertion hole 44 is opened toward the thinned part 46. For this reason, it is possible to easily perform a bolt fastening operation by using the thinned part 46.

Next, a method of connecting the vehicle body fastening member 4 to the side wall part 23 of the case 2 (a method of manufacturing the battery pack 1) will be described. The vehicle body fastening member 4 is connected to each of the upper and lower horizontal wall surfaces 252 and 252 (the upper surface and the lower surface) of the side wall part 23 by the clamping part 41 which forms the hooking structure. Specifically, as shown by the dot-dashed line in FIG. 2, the vehicle body fastening member 4 is connected from the side of the case 2 in the length direction by clamping each of the upper and lower horizontal wall surfaces 252 and 252 of the side wall part 23 from above and below with the pair of clamping pieces 411 and 411 of the clamping part 41. In other words, the vehicle body fastening member 4 is hooked and connected by clamping the side wall part 23 from above and below with the clamping part 41. Therefore, the vehicle body fastening member 4 is easily and reliably connected to the case 2. In addition, since the movement of the vehicle body fastening member 4 in the vertical direction is blocked by the clamping pieces 411 and 411 of the clamping part 41 which clamp the horizontal wall surfaces 252 and 252, the vehicle body fastening member 4 is easily positioned in the vertical direction with respect to the case 2.

Similarly, the vehicle body fastening members 4 of a required number are connected to each of the side wall parts 23 of the case 2. In the present embodiment, three vehicle body fastening members 4 are respectively connected to each of the side wall parts 23 of the case 2. After each of the vehicle body fastening members 4 is mounted by clamping each of the upper and lower horizontal wall surfaces 252 and 252 of the side wall part 23 from above and below with the pair of clamping pieces 411 and 411 of the clamping part 41, by sliding and moving along the length direction of the case 2, the vehicle body fastening members 4 are each arranged independently at arbitrary positions in the length direction of the case 2.

Here, when the vehicle body fastening member 4 is connected to the side wall part 23 from the side in the length direction of the case 2, the clamping projected part 45 provided in the clamping piece 411 is engaged with the engaging groove part 26 of the side wall part 23. Therefore, when the vehicle body fastening member 4 is slid and moved along the length direction of the case 2, the vehicle body fastening member 4 can be slid and moved smoothly because of being guided by the clamping projected part 45 and the engaging groove part 26 which are engaged, and the vehicle body fastening member 4 can be easily arranged at arbitrary positions. In addition, since the movement of the vehicle body fastening member 4 in the width direction of the case 2 is restricted by the engagement of the clamping projected part 45 and the engaging groove part 26, the vehicle body fastening member 4 is also positioned with respect to the width direction of the case 2.

Then, the vehicle body fastening member 4 is bonded to the case 2 by friction stir welding. In the friction stir welding, as shown in FIG. 6, while a friction stir tool 300 having a protruding part 301 at its tip is rotated, a load is applied to press it against a bonding portion, the protruding part 301 is penetrated into the bonding portion, the frictional heat of the rotating protruding part 301 softens the bonding portion, and the bonding portion is integrated by plastically flowing and kneading the periphery of the bonding portion. In the friction stir welding, since there is no risk of causing thermal distortion at the welding portion such as in the case of, for example, laser welding, etc., there is no risk of distortion occurring in the case 2 at the time of bonding. Although FIG. 6 shows bonding the upper clamping piece 411 of the vehicle body fastening member 4 with the case 2, the bonding may also be performed respectively on both of the pair of upper and lower clamping pieces 411 and 411.

At this time, the friction stir tool 300 is operated on the bonding portion of the vehicle body fastening member 4 and the case 2 from at least one of the directions along the vertical direction of the case 2. FIG. 6 shows how the upper clamping piece 411 of the vehicle body fastening member 4 and the case 2 are bonded. A front end surface 411b of the clamping piece 411 of the vehicle body fastening member 4 connected to the side wall part 23 of the case 2 abuts the vertical wall surface 251 of the stepped part 25 of the case 2, and the inner surface 411 a of the clamping piece 411 abuts the horizontal wall surface 252 of the stepped part 25. In addition, the clamping projected part 45 of the clamping piece 411 of the vehicle body fastening member 4 is engaged with the engaging groove part 26 of the case 2. Further, each of the inclined surfaces 451 and 261 of the clamping projected part 45 and the engaging groove part 26 abuts with each other.

The protruding part 301 of the friction stirring tool 300 is pressed from above of the case 2 to the abutting surface between the front end surface 411b of the clamping piece 411 and the vertical wall surface 251 of the stepped part 25. The upper clamping piece 411 is pressed in the downward direction by the load at the time of the pressing. At this time, since the clamping piece 411 and the horizontal wall surface 252 abut each other, the horizontal wall surface 252 functions as a load receiving surface and can receive the load at the time of friction stir welding. Therefore, the load at the time of friction stir welding is unlikely to act on the opening part (the housing part 20 of the single battery cell group 3) of the case 2, and the risk of deformation of the case 2 can be reduced.

In addition, at the time of friction stir welding, the rotation of the protruding part 301 applies a stress in the torsional direction to the bonding portion. At this time, in addition to the abutment of the front end surface 411b of the clamping piece 411 and the vertical wall surface 251 of the stepped part 25, the inclined surfaces 451 and 261 of the clamping projected part 45 and the engaging groove part 26 are abutted to each other, thus it is possible to distribute the load at the time of friction stir welding as well as resist the stress in the torsional direction which acts on the bonding portion. For this reason, there is no risk of displacing the vehicle body fastening member 4 at the time of friction stir welding.

Similarly, after each of the vehicle body fastening members 4 is bonded to the case 2 by friction stir welding, the battery pack 1 having the vehicle body fastening members 4 is fastened to the vehicle body frame 100 as shown in FIG. 7. In other words, by inserting the bolt 200 into the bolt insertion hole 44 of each of the vehicle body fastening members 4, the battery pack 1 is attached to the vehicle body frame 100 through the bolts 200.

Here, since the plurality of vehicle body fastening members 4 are independent of each other, even if the separation distance between the vehicle body frame 100 and the case 2 is not fixed, as shown in FIG. 7, by using the vehicle body fastening members 4 having appropriate heights according to the separation distance at each position between the vehicle body frame 100 and the case 2, the battery pack 1 can be fastened to the vehicle body frame 100 in an easy and stable fastening state.

For example, in the battery pack shown in the comparative example of FIG. 8, as shown in FIG. 9, in the case where the separation distance between the vehicle body frame 100 and the case 400 is not fixed, since the separation distance between the vehicle body frame 100 and the fastening part 500 is also not fixed, the fastening part 500 cannot be closely fastened to the vehicle body frame 100, and the bolt axial force of the bolt 200 cannot be properly applied to the fastening part 500 and the vehicle body frame 100. For this reason, there is a risk that the fastening state may become unstable. Further, in this case, it is necessary to interpose a shim or the like between the fastening part 500 and the vehicle body frame 100, which complicates the fastening operation.

In the above embodiment, the vehicle body fastening members 4 are respectively provided on the two side wall parts 23 and 23 with respect to the one case 2, but the disclosure is not limited thereto. For example, although not shown in the drawings, in the case where two cases 2 and 2 respectively housing the single battery cell groups 3 are arranged in parallel, the vehicle body fastening members 4 may also be provided only on the two outer side wall parts 23 and 23 of the cases 2 and 2. In this case, the inner side wall parts 23 and 23 of each of the cases 2 and 2 are integrally connected by a separate connecting member.

Further, in the above embodiment, the clamping projected part 45 is provided in the clamping piece 411 of the vehicle body fastening member 4, and the engaging groove part 26 is provided in horizontal wall surface 252 of the stepped part 25 of the case 2, but the disclosure is not limited thereto. For example, although not shown in the drawings, the clamping piece 411 of the vehicle body fastening member 4 may also be provided with a clamping recessed part, and the horizontal wall surface 252 of the stepped part 25 of the case 2 may also be provided with an engaging projected part.

What is claimed is:

1. A battery pack comprising a plurality of stacked single battery cells, a case for housing the plurality of stacked single battery cells, and a vehicle body fastening member for fastening the case to a vehicle body frame, wherein the vehicle body fastening member is provided separately from the case, is connected to at least one of two side wall parts opposing each other in a width direction of the case by a hooking structure facing an upper surface and a lower surface of the side wall part, and is independently provided at a plurality of arbitrary positions along a length direction of the case, wherein the vehicle body fastening member has a clamping part which abuts the upper surface and the lower surface of the side wall part to clamp the side wall part from above and below, and the vehicle body fastening member is hooked and connected to the side wall part by the clamping part.

2. The battery pack according to claim 1, wherein
the vehicle body fastening member has a clamping projected part or a clamping groove part on an inner surface of the clamping part respectively opposite to the upper surface and the lower surface of the side wall part; and an engaging groove part corresponding to the clamping projected part or an engaging projected part corresponding to the clamping groove part is provided on the upper surface and the lower surface of the side wall part, wherein the vehicle body fastening member is hooked and connected to the side wall part by engagement of the clamping projected part or the clamping groove part and the engaging groove part or the engaging projected part.

3. The battery pack according to claim 2, wherein the engaging groove part or the engaging projected part are provided along the length direction of the case, and
the vehicle body fastening member is independently provided at a plurality of arbitrary positions along a length direction of the engaging groove part or the engaging projected part by the clamping part.

4. The battery pack according to claim 1, wherein the vehicle body fastening member further comprises a flange part which is provided so as to protrude from an upper part of the clamping part to a side of the case and forms a fastening part with the vehicle body frame, and a beam part which extends obliquely from the clamping part to the flange part.

5. The battery pack according to claim 4, wherein the vehicle body fastening member has a thinned part which is thinned with the beam part left on an outer side of the clamping part, and
the flange part has a bolt insertion hole which vertically penetrates through the flange part and is opened toward the thinned part.

6. A method of manufacturing a battery pack comprising a plurality of stacked single battery cells, a case for housing the plurality of stacked single battery cells, and a vehicle body fastening member for fastening the case to a vehicle body frame, the method comprising:

extrusion-molding the case with a metal material along a stacking direction of the single battery cells; and at a plurality of arbitrary positions along a length direction of the case, connecting the vehicle body fastening member, which is provided separately from the case, independently to at least one of two side wall parts opposing each other in a width direction of the case by a hooking structure facing an upper surface and a lower surface of the side wall part, and afterwards, bonding the vehicle body fastening member respectively to the case by friction stir welding from at least one direction in a vertical direction of the case with the upper surface or the lower surface of the side wall part as a load receiving surface, wherein the vehicle body fastening member has a clamping part which abuts the upper surface and the lower surface of the side wall part to clamp the side wall part from above and below, and when the vehicle body fastening member is independently connected to the plurality of arbitrary positions along the length direction of the case, the vehicle body fastening member is hooked and connected to the side wall part by the clamping part.

7. The method of manufacturing a battery pack according to claim 6, wherein the vehicle body fastening member has a clamping projected part or a clamping groove part on an inner surface of the clamping part opposite to the upper surface and the lower surface of the side wall part; and an engaging groove part corresponding to the clamping projected part or an engaging projected part corresponding to the clamping groove part is provided on the upper surface and the lower surface of the side wall part, and when the vehicle body fastening member is independently connected to the plurality of arbitrary positions along the length direction of the case, the vehicle body fastening member is hooked and connected to the side wall part by engagement of the clamping projected part or the clamping groove part and the engaging groove part or the engaging projected part.

8. The method of manufacturing a battery pack according to claim 7, wherein the engaging groove part or the engaging projected part is provided along the length direction of the case, and when the vehicle body fastening member is independently connected to the plurality of arbitrary positions along the length direction of the case, the positions along the length direction of the case are adjusted by sliding and moving the vehicle body fastening member along the engaging groove part or the engaging projected part through the clamping part.

* * * * *